Patented May 23, 1950

2,508,735

UNITED STATES PATENT OFFICE 2,508,735

GLAZING COMPOSITIONS

Harry T. Van Horn, Highland Park, N. J., assignor to Socony-Vacuum Oil Company, Incorporated, a corporation of New York No Drawing. Application June 18, 1947, Serial No. 755,471

11 Claims. (Cl. 106—48)

This invention has to do with glaze coatings on ceramic ware.

Many ceramic articles, after forming and either before or after a preliminary firing, are coated with a slip or slurry consisting of water suspensions of selected ceramic materials which are capable of fusion to form a glass. The purpose of the glaze is to form a water proof coating or to add to the appearance or decoration of the ceramic article.

The two general types of glaze are (1) raw or earthy glazes and (2) fritted glazes. Raw glazes are composed of insoluble raw materials and are fused after they have been applied to the body. Fritted glazes are glazes which have been premelted and ground before they are applied to the body and thus form a smooth glass coating on the ware at a relatively low fusion temperature.

The glaze compositions in their dry states are powders and depend on the use of clay in the formula to keep them suspended in water and to make them adhere to the ware on application. The amount of clay used in a raw glaze is usually limited to 15% so that drying shrinkage is not excessive. The amount of clay used in a fritted glaze is kept at a minimum compatible with good suspension and adherence.

The glaze slips or slurries may be applied to greenware (unfired ware) or biscuit ware (fired ware) by either dipping, spraying or brushing.

Ceramic articles, to which a glaze slip has been applied, are necessarily subject to handling in placing them in position for firing. Glazes which have poor adherence tend to rub off when handled, or to chip and flake off upon contact as in stacking of pieces, and leave marred or vacant spots. Since most glazes have rather low flow characteristics, such marred and vacant places give rise to unglazed or improperly glazed spots on finished ware, leading to rejection.

This invention has for its object the provision of glaze compositions which stay in water suspension for longer periods of time and which have improved handling strength after the coating is applied and dried.

Various additives for improving glaze compositions in these respects have been proposed. Methyl cellulose, ethyl cellulose, dextrins, starches and other carbohydrates, gums and glues of various compositions have been so utilized. Each apparently has some acceptance but none appear to be widely used. Each appears to lack the ability to be effective in every application.

Wax emulsions have been so used with fair success over a fairly wide variety of applications. Although a wax emulsion in a glaze will aid suspension and promote even glaze flow it does not impart as great a dry handling strength as might be wished for in a product of wide application.

This invention is based upon the discovery that by adding to glaze compositions a wax emulsion containing a lignin composition there is obtained, upon drying, a glaze of quite desirably high-dry handling strength suitable for use in most, if not in all, of the usual applications. Glaze suspension is also materially aided by the use of such a composition.

The lignin compositions with which this invention is concerned are the alkali metal and alkaline earth metal salts of ligno-sulfonic acids. The ligno-sulfonic acids originate as waste material from the production of Kraft and other papers. A common commercial form is the calcium salt of ligno-sulfonic acids, which appears in commerce as "Lignon" and as "Clarion Extract" and possibly under other trade names. Such materials have the ability of drying to a rather hard tough film, and do not carry minerals of a kind or in a quantity sufficient to upset the formulation or action of customary glaze compositions. The organic materials therein are found to decompose and/or be volatile at a range of temperatures such that they may be removed from the glaze film during the heating up period of glost firing. Of the several materials which may be so used, the above referred to calcium salt of the ligno-sulfonic acids is preferred.

In compounding the glaze material, the usual glaze forming ceramic ingredients are to be utilized. The change to be made is that of incorporating in the aqueous suspension of such materials two things, the first of which is the metal salt of ligno-sulfonic acids mentioned above, and the second of which is a wax. Both are incorporated by adding to the glaze mix a water-borne emulsion of petroleum waxes to which has been added the salt of ligno-sulfonic acid.

Exemplary of such a mixture is the widely used Cone 5, Semi-vitreous dinner-ware glaze with a composition as follows:

| | Per cent |
|---|---|
| Feldspar | 14.42 |
| Whiting | 9.58 |
| Frit | 52.3 |
| Zinc oxide | 3.25 |
| China clay | 7.13 |
| Flint | 3.32 |

Frit:

| | |
|---|---|
| Feldspar | 22.74 |
| Red lead | 26.27 |
| Whiting | 5.23 |
| Boric acid | 16.88 |
| Flint | 28.88 |

Various colored glazes may be made by adding coloring oxides to the above composition.

The materials are made into a slurry by ball milling with water and are screened and adjusted to a certain specific gravity prior to use. The solids content is usually around 60%.

To such a glaze composition there may be added, in accordance with this invention, a small proportion of an aqueous emulsion of wax to which has been added a salt of ligno-sulfonic acid.

As an example of such a composition, there may be noted the following:

Example I

The following wax emulsion was prepared:

| | Weight percent |
|---|---|
| Paraffins, 124–126 melting point (AMP) | 40.0 |
| Mixed emulsifiers | 1.5 |
| Oxidation inhibitor and germicide | .2 |
| Water | 58.3 |

A solution of calcium salt of ligno-sulfonic acid having about 50% of solids and 50% of water (wt. basis) was then mixed with the wax emulsion in the following proportions:

Wax emulsion—seven parts (volume).
Lignin solution—three parts.

This blend of materials was added to the dinnerware glaze in the proportion of 4 pounds of blend to 165 pounds of 60% solids content glaze.

The resulting glaze mixture was found to maintain its suspension for considerably longer periods of time than the untreated glaze. The glaze was applied to biscuit ware by spraying and after drying the resulting coating was found to be possessed of superior dry handling strength, less liable to rub off, chip or flake during handling than was the untreated glaze.

Similar beneficial results were obtained on a raw porcelain glaze consisting of feldspar, whiting, zinc oxide, flint and china clay.

In general, the wax emulsion may be any water-borne dispersion of any wax, i. e. animal or vegetable waxes of suitable melting point, or petroleum waxes of paraffin, or of microcrystalline wax nature. The emulsifier may be of any type, anionic, cationic or non-ionic, but is preferably non-ionic in order that the glaze dispersion may not be affected by the introduction of electrolytes. The solids concentration of this emulsion may be from about 5% up to the rather heavy compositions of around 60% solids. The criteria here are rather loose, the lower limit being determined somewhat by the fact that dilute emulsions tend to add too much water to the final glaze mix when adding a given amount of wax and lignin material, and upon the upper end of emulsion concentration the emulsions themselves are not easily handled.

The proportioning of the salt of ligno-sulfonic acid to the wax may vary from about 20 parts of wax to about 80 parts of salt of ligno-sulfonic acid up to about 95 parts of wax to 5 parts of the salt of ligno-sulfonic acid. These proportions are based upon the respective solids themselves.

In using these materials, the amount to be added will run from about 0.5% to about 10% by weight, percentage being determined on the dry weight of the glaze ingredients. The preferred percentages will run from about 2% to about 7% by weight, as calculated above.

In making the modified glazes, attention should be paid to determining the proportion of wax-lignin mixture to be added, and the nature of the wax-lignin mixture with respect to the effect upon the viscosity and similar properties of the modified glaze composition. The wax-lignin mixture is stable to electrolytes and so is not affected by the addition of deflocculants or thickening agents which are used to modify glaze consistencies. The wax-lignin mixture is not a wetting agent and so does not lower surface tension which would lead to foaming in the glaze. The mixture does improve glaze flowability and thus promote the obtention of smooth glaze coatings which are especially free from crazing and other defects due to uneven glaze applications.

While certain specific compositions of glaze and of wax emulsions have been described herein, they have been given by way of example, and the invention is to be understood as not being limited thereto or thereby, but subject only to such limitations as appear in the claims.

I claim:

1. A ceramic glazing composition comprising, in aqueous suspension, ceramic glaze ingredients, wax, and a material selected from the group consisting of the alkali metal and alkaline earth metal salts of ligno-sulphonic acid.

2. A ceramic glazing composition comprising in aqueous suspension, ceramic glaze ingredients, a wax of petroleum origin, and a material selected from the group consisting of the alkali metal and alkaline earth metal salts of ligno-sulphonic acid.

3. A ceramic glazing composition comprising in aqueous suspension, ceramic glaze ingredients, wax of petroleum origin, and an alkaline earth metal salt of ligno-sulphonic acid.

4. A ceramic glazing composition comprising predominantly an aqueous suspension of ceramic glaze ingredients to which there has been added a lesser amount of an aqueous emulsion of a wax in a solution of a calcium salt of ligno-sulphonic acid.

5. A ceramic glazing composition comprising an aqueous suspension of ceramic glaze ingredients, wax, and an alkaline earth metal salt of ligno-sulphonic acid, the total weight of wax plus metal salt ranging from about ½% to about 10% (dry basis) by weight of the ceramic glaze ingredients (solids only) present.

6. A ceramic glazing composition comprising an aqueous suspension of ceramic glaze ingredients of solids concentration suitable for glazing unfinished ware, and dispersed in such glaze composition a mixture of wax and alkali metal salts of ligno-sulphonic acid, the total amount of said wax plus metal salt being from about ½% to about 10% (dry basis), of the solid ceramic glaze materials present.

7. A ceramic glazing composition comprising an aqueous suspension of ceramic glaze ingredients of solids concentration suitable for glazing unfinished ware, and dispersed in such glaze composition a mixture of wax and alkali metal salts of ligno-sulphonic acid, the total amount of said wax plus metal salt being from about ½% to about 10% (dry basis), of the solid ceramic glaze materials present, and the proportions of wax to salt ranging from 20 parts of wax to 80 parts of salt to 95 parts of wax to 5 parts of salt, all by weight.

8. A ceramic glazing composition comprising an aqueous suspension of ceramic glaze ingredients of solids concentration suitable for glazing unfinished ware, and dispersed in such glaze composition a mixture of wax and alkali metal salts of ligno-sulphonic acid, the total amount of said wax plus metal salt being from about 2% to about 7% (dry basis), of the solid ceramic glaze materials present.

9. A ceramic glazing composition comprising an aqueous suspension of ceramic glaze ingredients of solids concentration suitable for glazing unfinished ware, and dispersed in such glaze composition a mixture of wax and calcium salts of ligno-sulphonic acid, the total amount of said wax plus salt being from about ½% to about 10% (dry basis), of the solid ceramic glaze materials present.

10. A ceramic glazing composition comprising an aqueous suspension of ceramic glaze ingredients of solids concentration suitable for glazing unfinished ware, and dispersed in such glaze composition a mixture of wax and calcium salts of ligno-sulphonic acid, the total amount of said wax plus salt being from about ½% to about 10% (dry basis), of the solid ceramic glaze materials present, and the proportions of wax to salt ranging from 20 parts of wax to 80 parts of salt to 95 parts of wax to 5 parts of salt, all by weight.

11. A ceramic glazing composition comprising an aqueous suspension of ceramic glaze ingredients of solids concentration suitable for glazing unfinished ware, and dispersed in such glaze composition a mixture of wax and calcium salts of ligno-sulphonic acid, the total amount of said wax plus salt being from about 2% to about 7% (dry basis), of the solid ceramic glaze materials present.

HARRY T. VAN HORN.

REFERENCES CITED

The following references are of record in the file of this patent:

UNITED STATES PATENTS

| Number | Name | Date |
|---|---|---|
| 1,243,362 | Terrell et al. | Oct. 16, 1917 |
| 1,651,474 | Scott | Dec. 6, 1927 |
| 2,422,215 | Amberg et al. | June 17, 1947 |

Certificate of Correction

Patent No. 2,508,735            May 23, 1950

HARRY T. VAN HORN

It is hereby certified that error appears in the printed specification of the above numbered patent requiring correction as follows:

Column 2, line 46, for "52.3" read *62.3*;

and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*